No. 607,504. Patented July 19, 1898.
D. CROWTHER.
SOLDER.
(Application filed Dec. 20, 1897.)
(No Model.)
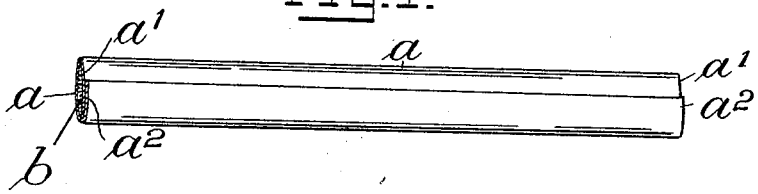
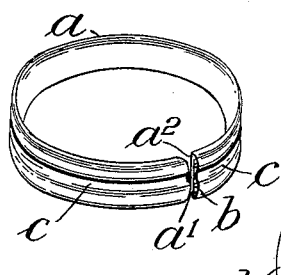
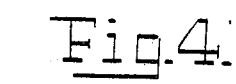
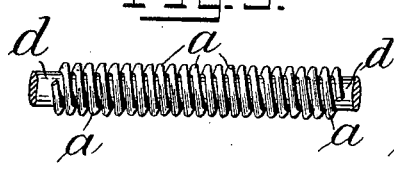
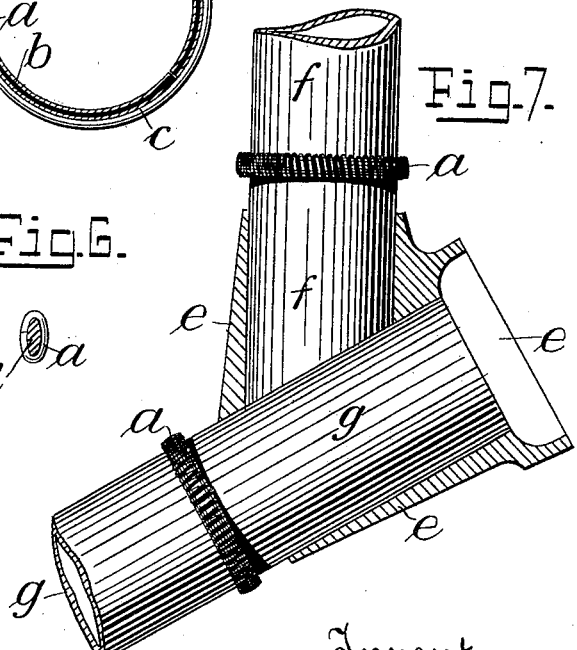
Witnesses:
Inventor:
David Crowther.
by Herbert W. Jenner.
Attorney.
THE NORRIS PETERS CO., PHOTO-LITHO., WASHINGTON, D. C.

UNITED STATES PATENT OFFICE.

DAVID CROWTHER, OF HUDDERSFIELD, ENGLAND.

SOLDER.

SPECIFICATION forming part of Letters Patent No. 607,504, dated July 19, 1898.

Application filed December 20, 1897. Serial No. 662,559. (No model.)

*To all whom it may concern:*

Be it known that I, DAVID CROWTHER, a subject of the Queen of Great Britain, residing at Milnsbridge, Huddersfield, in the county of York, England, have invented certain new and useful Improvements in Solders; and I do hereby declare the following to be a full, clear, and exact description of the invention, such as will enable others skilled in the art to which it appertains to make and use the same.

This invention relates to brazing or soldering material for brazing the joints of cycle frames and fittings and other tubular or hollow and solid metal fittings or parts.

The object of my invention is to produce a combined or composite spelter or brazing material for application in one piece and in a prepared state to the joint to be brazed, the said composite brazing material comprising a brazing metal with which is combined a flux applied so as to form a part of the brazing-piece and to insure the flow of the metal when fused, these said composite brazing-pieces being directly attachable to the joint to be brazed, and when fused filling the joints uniformly throughout and making a perfect weld without waste of material or the deposit of the mixture on the outside of the parts, whereby filing of the parts when cooled to clean them, with all attendant risks, are avoided, while unskilled labor can be employed in the process.

For the aforesaid purpose my invention consists of the solder, as hereinafter fully described.

In the accompanying drawings, illustrating my invention, Figure 1 is an elevation showing the construction of my improved composite or combined brazing material when the flux employed is in a powdered state. Fig. 2 is a perspective view showing the brazing material bent to form a circle or ring to fit over tubular fittings. Fig. 3 is a similar view of a wire band for securing the said ring on the fittings. Fig. 4 is a sectional plan showing the wire band applied to the brazing-ring. Fig. 5 is an elevation showing the construction of the composite or combined brazing material when made of wire instead of sheet metal. Fig. 6 is a transverse section of Fig. 5; and Fig. 7 is a section of the ball-head lug of a cycle-frame, illustrating the method of applying the composite brazing-rings thereto.

The same letters of reference denote corresponding parts throughout.

Referring, first, to Figs. 1 to 4, in which I show the construction of the composite brazing-piece which I prefer to adopt when sheet metal is employed and the flux is in a powdered state, letter $a$ denotes a strip of brass or brazing metal having its lateral or longitudinal edges $a'$ $a^2$ folded over on one side thereof and overlapping each other, so as to inclose and seal up within the inner fold at $b$ a supply of flux (borax) which has previously been burned to drive out all water of combination and then preferably reduced to a powder. The lateral edges $a'$ $a^2$ of the strip $a$ are folded over by passing a length of strip between a series of rolls, which first bend the edge $a'$ to an angle to form a channel, into which the flux is charged, after which the edge $a^2$ is bent over and both edges flattened upon the inclosed flux in the form shown at Fig. 1.

The strip $a$, with its inclosed flux, can be used in the form shown at Fig. 1 for solid flat or butt-ended joints, and if the joint is angular the strip is bent to fit it. For tubular joints, however—such as those in cycle-frames, whether round, oval, or D-shaped in cross-section—the strip $a$ is indented centrally along its length to form a groove $c$ and then is bent around a mandrel to the section desired to form a ring or ferrule, as shown at Fig. 2. To prevent the ring or ferrule when applied over the joint from expanding under the influence of the heat applied and falling away previous to being fused, I force over the said ring and into the groove $c$ therein a split band $d$, composed of iron wire having a higher fusing-point than brazing metal and which will spring a little.

When forced into the groove $c$, the band $d$ holds the opposing ends of the ring $a$ close to each other, allowing said ring to be pushed over the tube it is made to fit and holding it securely in position thereon until the whole of the ring $a$ has been fused, when it can be easily removed from the tube while hot by a pair of pincers or pliers.

If the ring $a$ were not secured on the tube to be brazed by some such means as the band $d$, one half of the ring might be fused before the other half, thereby allowing the latter half to fall or to be blown away by the jet from the blowpipe, and there would also be the danger of the whole ring dropping by reason of it expanding when heated and leaving the walls of the tube.

The wire band $d$ could be laid in a straight length on the brazing material when folding over the edges $a'$ $a^2$, so as to be secured within the folds; but I have found it preferable to apply the band on the outside of the ring $a$, as described.

In placing the band $d$ around the ring $a$ the meeting ends of the same are arranged to be a little removed from or on the opposite side to the meeting ends of the ring $a$, as will be seen at Fig. 4.

I have found the above-described method of making the composite brazing material when employing powdered flux to be simple and easy; but it will be obvious that the powdered flux can be inclosed within a brazing metal in other ways than that described, such as in a hollow casing or sheath, which is subsequently flattened, or in an endless ring whose edges could be turned over each other and flattened against the flux introduced within the folds.

Instead of incasing the flux in a brazing metal in the manner above described I can apply it in the form of a concentrated solution spread or brushed evenly over the surface of a sheet of brazing metal, which is then passed through a furnace or oven having a sufficiently high temperature to vitrify or solidify the flux, which thus forms a vitreous enamel, glaze, or film on the surface of the brazing metal.

For flat joints the composite brazing material thus made may be in the flat sheet and either plain, perforated, or reticulated. For tubular joints the brazing metal is composed of wire $a$, Figs. 5 and 6, which is coiled around a central band or core $d$, of iron or non-brazable wire of oval, round, or angular section, the oval section being very suitable. The coiled-wire brazing metal, with its core of iron wire, is wound or coiled around a mandrel to make it circular, oval, or D-shaped, and each coil thus made on the mandrel is then severed to form the brazing-ring $a$, which can be slightly expanded, and is made to fit tightly on the fitting or part to be brazed. The concentrated solution of flux is applied to the ring to fill up or approximately fill the interstices between each coil of wire and to cover the surface of the wire all around the ring, the ring being subsequently subjected to a sufficiently high temperature to glaze or vitrify the flux. If the ring be handled with care, the flux will not scale off.

When the composite brazing-rings are sold in quantities in the various sizes required, it is safer to combine the flux with the brazing metal in the form of an enamel or glaze on the surface thereof on the lines last described, because when made up in the form shown at Fig. 2 there is liability of the powdered flux being affected by moisture if not used within a reasonable time, and consequently when applied to the joints and heated the flux is apt to swell and split the brazing-metal covering, whereas when a flux coating or enamel is applied it is not affected by moisture to the same extent and will do no injury to the ring $a$ by swelling when heated.

I have shown at Fig. 7 the manner of applying the composite brazing-rings to the joints of cycle-frames for brazing the parts together. $e$ represents the ball-head lug of a cycle-frame, and $f$ and $g$ the two tubes, which fit into and are to be brazed to same. The rings $a$, shown to be of the construction described with reference to Figs. 5 and 6, but which may be of the construction shown at Fig. 2, are passed over the ends of each tube $f$ $g$ before said tubes are inserted into the lug $e$, and when the tubes have been inserted in said lug the rings $a$ are placed a little away from the end of each joint—say about one-quarter of an inch—where they are firmly held by the tension of the core $d$. It is essential in brazing by means of said rings that the joints should be vertical, a suitable brazing-hearth, preferably of the kind embodied in another application for United States Patent filed on the same date, partially surrounding same, so as to throw back the heat onto the rear and lateral sides of the joint, where the jet from the blowpipe cannot very well be directed. In holding the joint vertical, as shown in the case of the tube $f$, the spelter on fusing flows down the tube and between it and lug $e$ right to the bottom of the joint, (which has been heated from the bottom upward,) filling said joint uniformly on all sides from the bottom up to the top thereof.

When the tube $f$ has been brazed to the lug $e$, the tube $g$ is brought quickly to the vertical to braze it to the said lug. The quantity of brazing metal necessary to nicely fill any particular size of joint being first ascertained the requisite proportion can be put into each brazing-ring of the same size for corresponding joints and the flux applied in such proportion as will insure the ready flow of the metal when fused, the proportions of the two materials being varied for larger and smaller joints in a ratio approximating or corresponding to the increase or reduction in the diameter and depth of joint, which can be judged fairly accurately or may be found by experiment.

The brazing-wire may be wound around the core $d$ in fine or coarse coils to vary the spaces between each coil, as found most suitable.

The coiled-wire brazing-rings may be used without fixing an enamel or coating of flux thereon, the flux being applied with a brush in the form of a concentrated solution after placing the ring on the tube to be brazed to the lug; but there is no certainty in applying flux in such manner, too much or too little being given even when exercising the greatest care, thus endangering the making of a good joint and requiring a careful and skilled brazier.

The composite or combined brazing material or strip, ring, or ferrule made as herein described is ready for immediate application to its particular form of joint and only needs fusing after the joint has been heated to give a perfect weld. It requires no skilled labor to attach it in position on the fitting or to braze the joint. It fills the joint uniformly throughout and avoids the deposit of spelter on the outside parts, such as takes place in the ordinary process of brazing, and consequently minimizes the filing and cleaning of the outside parts of the joints after brazing.

For heavy parts or strong solid sections requiring a very strong joint a brazing metal of a special mixture or composition possessing great tensile strength and fusible at an approximately low temperature may be employed.

The brazing material above described may be made in any form, shape, or size to correspond with the description of joint for which it is intended, there being such a variety of joints that it is impossible to enumerate all.

I claim as my invention—

1. A collapsible strip or bar formed of solder and provided with means for holding in position a spring which presses it upon the object to which it is to be united, substantially as set forth.

2. A collapsible circlet formed of solder and provided with an external groove for holding in position a spring which presses it upon the object to which it is to be united, substantially as set forth.

3. A collapsible hollow circlet formed of solder and containing flux, said circlet being also provided with an external groove for holding a spring in position, substantially as set forth.

In testimony whereof I affix my signature in presence of two witnesses.

DAVID CROWTHER.

Witnesses:
EDGAR MATHER,
THOMAS H. BARRON.